US011249943B2

(12) United States Patent
Jiao et al.

(10) Patent No.: US 11,249,943 B2
(45) Date of Patent: Feb. 15, 2022

(54) SCALABLE ENTERPRISE CONTENT MANAGEMENT (71) Applicant: INTERNATIONAL BUSINESS MACHINES CORPORATION, Armonk, NY (US)

(72) Inventors: Li Mei Jiao, Beijing (CN); Yun Jie Qiu, Shanghai (CN); James A. Reimer, Morgan Hill, CA (US); Ju Wei Shi, Beijing (CN); Paul S. Taylor, Redwood City, CA (US); Chen Wang, Beijing (CN); Xiao Yang Yang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 873 days.

(21) Appl. No.: 14/954,594

(22) Filed: Nov. 30, 2015

(65) Prior Publication Data
US 2017/0132271 A1    May 11, 2017

Related U.S. Application Data (63) Continuation of application No. 14/937,948, filed on Nov. 11, 2015, now Pat. No. 11,003,621.

(51) Int. Cl.
G06F 16/11 (2019.01)
G06F 11/14 (2006.01)
(Continued)

(52) U.S. Cl.
CPC .......... *G06F 16/122* (2019.01); *G06F 11/14* (2013.01); *G06F 12/0261* (2013.01);
(Continued)

(58) Field of Classification Search
None
See application file for complete search history.

(56) References Cited

U.S. PATENT DOCUMENTS 7,653,668 B1 * 1/2010 Shelat .................. G06F 16/184
707/610
8,239,356 B2 * 8/2012 Giampaolo ......... G06F 11/1441
707/695

(Continued)

OTHER PUBLICATIONS

Li Mei Jiao, et al., "Scalable Enterprise Content Management", U.S. Appl. No. 14/937,948, filed Nov. 11, 2015.

(Continued)

*Primary Examiner* — Neveen Abel Jalil
*Assistant Examiner* — John J Morris
(74) *Attorney, Agent, or Firm* — Cantor Colburn LLP; Joseph Petrokaitis (57) ABSTRACT Technical solutions are described to implement a scalable write ahead log using a distributed file system. A general aspect includes a method for providing consistency among metadata replicas and content in an enterprise content management cluster. The method includes recording a transaction log entry in response to receiving a content modification request, the transaction log entry including a version identifier set to a first version value. The method also includes updating the transaction log entry to a second version value in response to successfully modifying content and one of a plurality of metadata replicas containing metadata corresponding to the request. The method also includes updating the transaction log entry to a third version value in response to successfully modifying each of the metadata replicas. The present document further describes examples of other aspects such as methods, computer products.

14 Claims, 8 Drawing Sheets (51) Int. Cl.
*G06F 12/02* (2006.01)
*G06F 16/23* (2019.01)

(52) U.S. Cl.
CPC ...... *G06F 16/2365* (2019.01); *G06F 16/2379* (2019.01); *G06F 2212/1056* (2013.01)

(56) References Cited

U.S. PATENT DOCUMENTS

| | | | |
|---|---|---|---|
| 8,346,824 B1* | 1/2013 | Lyle | G06F 17/30206 707/822 |
| 8,627,135 B2 | 1/2014 | Aron et al. | |
| 8,683,262 B1 | 3/2014 | Subbiah et al. | |
| 8,868,492 B2 | 10/2014 | Garin, Jr. et al. | |
| 9,020,987 B1 | 4/2015 | Nanda et al. | |
| 9,507,843 B1* | 11/2016 | Madhavarapu | G06F 17/30575 |
| 9,678,981 B1* | 6/2017 | Taylor | G06F 17/30194 |
| 10,324,905 B1 | 6/2019 | Ross et al. | |
| 2005/0229166 A1* | 10/2005 | Todd | G06F 3/0619 717/136 |
| 2007/0088754 A1* | 4/2007 | Brannon | G06F 17/3051 |
| 2008/0005220 A1* | 1/2008 | Tsunakawa | G06F 9/466 709/201 |
| 2011/0196838 A1* | 8/2011 | Zunger | G06F 17/30194 707/636 |
| 2012/0179723 A1 | 7/2012 | Lin et al. | |
| 2013/0282668 A1* | 10/2013 | Hsieh | G06F 16/182 707/691 |
| 2014/0149368 A1* | 5/2014 | Lee | G06F 16/2329 707/695 |
| 2014/0279881 A1* | 9/2014 | Tan | G06F 16/2228 707/613 |
| 2014/0282615 A1* | 9/2014 | Gavage | G06F 9/4493 719/316 |
| 2015/0019792 A1* | 1/2015 | Swanson | G06F 12/0223 711/102 |
| 2015/0278243 A1* | 10/2015 | Vincent | G06F 17/30194 707/634 |
| 2015/0347447 A1* | 12/2015 | Ho | G06F 17/30174 707/622 |
| 2016/0011815 A1 | 1/2016 | Klein et al. | |
| 2016/0042023 A1* | 2/2016 | Leach | G06F 16/2365 707/703 |
| 2016/0070593 A1 | 3/2016 | Harris et al. | |
| 2016/0117317 A1* | 4/2016 | Freeman | G06F 30/00 707/797 |
| 2016/0267132 A1* | 9/2016 | Castellanos | G06F 16/256 |
| 2017/0017708 A1* | 1/2017 | Fuchs | G06F 16/288 |
| 2017/0031768 A1* | 2/2017 | Sarah | G06F 11/1446 |
| 2017/0091299 A1* | 3/2017 | Ngan | G06F 16/178 |

OTHER PUBLICATIONS

List of IBM Patents or Patent Applications Treated as Related; (Appendix P), Filed Jan. 25, 2016; 2 pages.

Ahmad et al.; "Transational Failure Recovery for a Distributed Key-Value Sore"; 2013 McGrill University and Universidad Politécnica de Madrid; pp. 1-20.

Garefalakis et al.; "ACaZoo: A Distributed Key-Value Store based on Replicated LSM-Trees"; 2014 IEEE 33rd International Symposium on Reliable Distributed Systems; pp. 1-10.

\* cited by examiner

SCALABLE ENTERPRISE CONTENT MANAGEMENT

DOMESTIC PRIORITY

This application is a continuation of U.S. Non-Provisional application Ser. No. 14/937,948, entitled "SCALABLE ENTERPRISE CONTENT MANAGEMENT," filed Nov. 11, 2015, which is incorporated herein by reference in its entirety.

BACKGROUND

The present application relates to Enterprise Content Management (ECM) systems, and more specifically, to improving scalability of an ECM system while satisfying constraints regarding atomicity, consistency, isolation, and durability (ACID) properties of a transaction as well as throughput and other performance related constraints.

An ECM system, among other stringent desirable properties, demands strong consistency, high throughput, and high availability. Traditionally, ECM systems are implemented using a relational-database. With the rapid growth of the amount of data stored in ECM systems, a relational database may become insufficient to handle data in the ECM system. Hence, an organization may opt to scale the ECM system. However, scaling the relational database, and consequently the ECM system, is difficult, project-specific, and incurs high cost.

SUMMARY

According to an embodiment, a general aspect includes a method for providing consistency among metadata replicas and content in an enterprise content management cluster. The method includes recording, by a processor, a transaction log entry in response to receiving a content modification request, the transaction log entry including a version identifier set to a first version value. The method also includes updating, by the processor, the transaction log entry in response to successfully modifying content and one of a plurality of metadata replicas containing metadata corresponding to the content modification request, where the version identifier of the transaction log entry is updated to a second version value. The method also includes updating, by the processor, the transaction log entry in response to successfully modifying each of the metadata replicas, where the version identifier of the transaction log entry is updated to a third version value.

One general aspect includes a system for providing consistency among metadata replicas and content in an enterprise content management cluster. The system includes an enterprise content management controller that receives a modification request sent by a client device, the modification request including instruction to modify content in the enterprise content management cluster. The enterprise content management controller initiates a transaction to execute the modification request, where the execution of the modification request includes modification of the content and recording metadata of the transaction in a plurality of metadata replicas. The enterprise content management controller assigns a transaction identifier to the transaction corresponding to the modification request. The enterprise content management controller inserts, in a write ahead log, a transaction log entry corresponding to the modification request. The transaction log entry includes a predetermined number of records respectively stored on a distributed file system, the records including a transaction identifier corresponding to the transaction log entry. The enterprise content management controller updates the transaction log entry using a plurality of version identifiers, where each of the version identifiers represents, respectively, a plurality of execution states of the modification request; and issue a command to delete the transaction log entry from the distributed file system in response to the modification request achieving a completed state.

Yet another aspect includes a computer product for a write ahead log in a content management system, the computer product including non-transitory computer readable storage medium. The non-transitory computer readable storage medium includes computer executable instructions to initiate a write ahead log for the content management system on a distributed file system that includes a predetermined number of nodes. The write ahead log includes a transaction entry for each respective transaction on content in the content management system, and the transaction entry includes records distributed across the predetermined number of nodes. The non-transitory computer readable storage medium includes computer executable instructions to receive a modification request sent by a client device, the modification request including instruction to modify content in the content management system. The non-transitory computer readable storage medium includes computer executable instructions to initiate a transaction to execute the modification request. The execution includes modification of the content and recording metadata of the transaction in a plurality of metadata replicas. The non-transitory computer readable storage medium includes computer executable instructions to assign a transaction identifier to the transaction corresponding to the modification request. The non-transitory computer readable storage medium includes computer executable instructions to insert, in the write ahead log, a transaction log entry corresponding to the modification request. The transaction log entry includes a plurality of records respectively stored on the nodes of the distributed file system, the records including a transaction identifier corresponding to the transaction log entry. The non-transitory computer readable storage medium includes computer executable instructions to update the transaction log entry using a plurality of version identifiers. Each of the version identifiers represents, respectively, a plurality of execution states of the modification request. The non-transitory computer readable storage medium includes computer executable instructions to issue a command to delete the transaction log entry from the distributed file system in response to the modification request achieving a completed state.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Disclosed here are technical solutions for scaling an Enterprise Content Management (ECM) system. The technical solutions facilitate an organization to scale the ECM system without incurring high costs by moving consistency and agent failover efforts to a key-value store (such as Hbase/HDFS) logs, keeping the current ECM Application Programming Interface (API), and cross-partitioning join and aggregate functions at an application level.

The ECM system organizes and stores an organization's documents, and other content related to the organization's processes. Data access transactions, such as storing, and/or reading data to/from the ECM system demands a high throughput and ACID in each transaction. For this purpose, the ECM system uses a write ahead logging (WAL) system. In the WAL, all modifications are written to a log before they are applied. As the ECM system is scaled, the corresponding WAL also is to be scaled. The described embodiments solve the technical problem of scaling the WAL, especially using commodity solutions that include commodity hardware/software. The technical solutions, accordingly, facilitate scaling a system using the WAL, such as the ECM system, while meeting the throughput and ACID transaction requirements.

In exemplary embodiments, the technical solutions adopt columnar database (such as HBase) and a specific schema design to implement a distributed write-ahead-log (WAL) of the ECM system. When each transaction in ECM created, committed, and finished in the ECM system, a respective entry is written into the columnar database to mark a time, a transaction ID, and a status (create, commit, finish) of the transaction. The WAL facilitates transaction recovery on failure. The embodiments may update the WAL for a specific transaction in the same row in the columnar database. By doing so, the WAL maintains a high-throughput as well as ACID property of the transactions.

The technical solutions further provide a customized compaction procedure in the columnar store to discard expired WAL entries efficiently. For example, when data is inserted into the columnar database, the data may be cached in memory, and then flushed onto disks when caches are full. The "flush" is called "compaction." The "expiration" of WAL may be assigned based on whether a transaction is successfully finished between two compactions. In such a situation, the WAL entry may not be maintained. Therefore, the technical solutions add a HashSet in the columnar database. When the ECM transaction is finished, the key of the finished transaction is added into the HashMap. During the compaction, if the transaction record to be compacted is in the HashSet, the WAL entry of the transaction record is directly discarded, preventing it from being written to disk. By doing so, expending disk I/O time during compaction is avoided maintaining the WAL's correct logic and consistency. In addition, disk space is saved. Thus, the technical solutions facilitate scaling of the WAL in an efficient manner, where the efficiency saves both time and disk space used.

Figure 1:
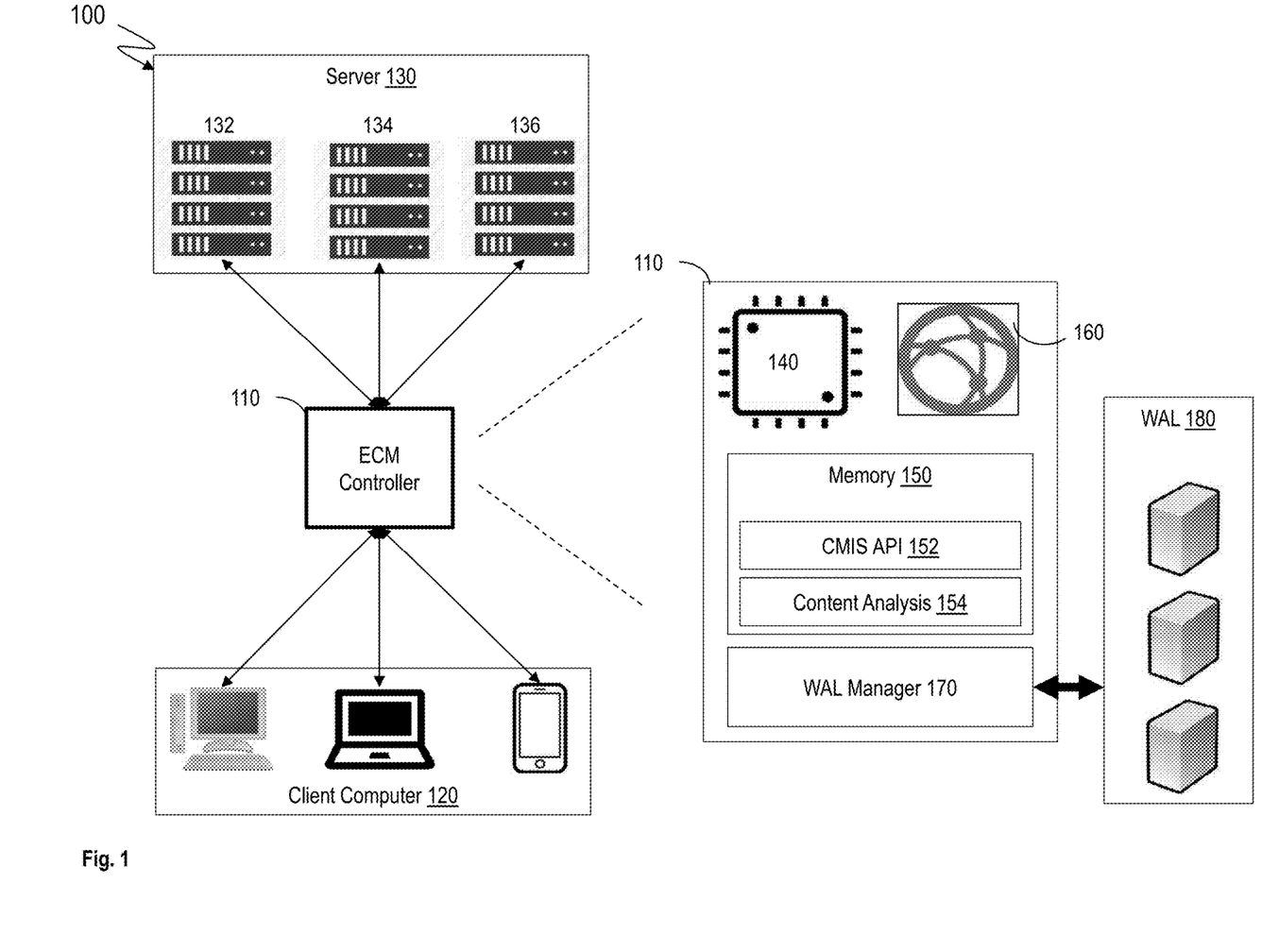
FIG. 1 illustrates an ECM system 100 in accordance with an embodiment.

FIG. 1 illustrates an ECM system 100 in accordance with an embodiment. The ECM system 100 includes, among other components, an ECM controller 110. The ECM controller 110 facilitates enterprise content management across a client computer 120 and a backend server 130. The ECM controller 110 further maintains a WAL 180 of transactions performed in response to a request from the client computer 120 and/or the backend server 130.

The client computer 120 is a computer used by a user to interact with the content that the ECM system 100 manages. The client computer 120 may be a desktop computer, a laptop computer, a tablet computer, a smartphone, or any other type of computer. The client computer 120 requests access to the content of the ECM system 100 to read or modify the content. Alternatively or in addition, the client computer 120 requests storage of new or modified content into the ECM system 100. The client computer 120 may also be used to configure the ECM system 100, if the client computer 120 is authorized to act as an administrator of the ECM system 100. The client computer 120 may include a user interface to interact with the content.

The backend server 130 stores the content. In an example, the ECM system 100 captures, manages, stores, preserves, and delivers the content related to organizational processes of an enterprise. The content may be in the form of digital content, such as documents, audio files, video files, multimedia presentations, email, or any other computer readable data. The backend server 130 may store the content in a distributed file system (DFS), such as Hadoop Distributed File System (HDFS), Oracle Cluster File System (OCFS), or any other DFS. Alternatively, the backend server 130 may store the content in a relational database.

The ECM system 100 may further facilitate web content management, search, collaboration, records management, digital asset management (DAM), workflow management, capture, and scanning of information on paper or other non-computer readable medium. To this end, the backend server 130 may include one or more backend servers. For example, the backend server 130 may include a server 132 that stores content, and a separate server 134 that parses and searches the content stored on the server 132, and further yet, a separate server 136 that archives the content from the server 132. In another example, the backend server 130 may include the server 132 that stores the content and the server 134 that includes metadata of the content stored on the server 132. The backend server 130, in other examples, may be configured to store other types of data, or store the content in any other manner than the above description. The backend server 130 provides additional functionality than storing the content. For example, the backend server 130 may parse the content and create metadata repositories corresponding to the content. To interact with the content stored in the backend server 130, the client computer 120 sends a request to the ECM controller 110.

The ECM controller 110 facilitates interaction with the content. For example, the ECM controller 110, based on the request from the client computer, identifies the content requested and any operation to be performed on the content. The ECM controller 110 subsequently accesses the content and either performs or has the operations performed on the content to provide a result to the client computer. The ECM controller 110 determines the operation to be performed on the content and communicates with the particular backend server 130 that performs the operations. The ECM controller may communicate with the backend server 130 according to Content Management Interoperability Services (CMIS) Application Programming Interface (API) if the backend server 130 supports the CMIS API. Alternatively or in addition, the ECM controller 110 may communicate with the backend server 130 according to a communication protocol specific to the backend server 130. Alternatively or in addition, the ECM controller 110 is responsible to maintain a predetermined throughput level and the ACID properties of a transaction when facilitating access to the content in this manner.

The ECM controller 110 may include a processor 140, a memory 150, a communication interface 160, and a WAL manager 170, among other components.

The processor 140 may be a central processor of the ECM controller 110 responsible for execution of an operating system, control instructions, and applications installed on the ECM controller 110. The processor 140 may be one or more devices operable to execute logic. The logic may include computer executable instructions or computer code embodied in the memory 150 or in other memory that when executed by the processor 140, cause the processor 140 to perform the features implemented by the logic. The computer code may include instructions executable with the processor 140. The computer code may include embedded logic. The computer code may be written in any computer language now known or later discovered, such as C++, C#, Java, Pascal, Visual Basic, Perl, HyperText Markup Language (HTML), JavaScript, assembly language, shell script, or any combination thereof. The computer code may include source code and/or compiled code. The processor 140 may be a general processor, central processing unit, server, application specific integrated circuit (ASIC), digital signal processor, field programmable gate array (FPGA), digital circuit, analog circuit, or combinations thereof. The processor 140 may be in communication with the memory 150 and other components of the ECM controller 110.

The memory 150 may be non-transitory computer storage medium. The memory 164 may be DRAM, SRAM, Flash, or any other type of memory or a combination thereof. The memory 150 may store control instructions and applications executable by the processor 140. The memory 150 may further include the CMIS API and content analytics. The memory 150 may contain other data such as images, videos, documents, spreadsheets, audio files, and other data that may be associated with operation of the ECM controller 110. In some examples, the memory 150 may store metadata associated with the content stored in the backend server 130.

The communication interface 160 facilitates communication to/from the ECM controller 110. For example, the communication interface 160 receives requests from the client compute 120 and, in response, communicates with the backend server 130. Further, the communication interface 160 communicates with the client computer 120 to provide results of the request from the client computer. Alternatively or in addition, the ECM controller 110 receives requests from the backend server 130 and communicates with the client computer 120 accordingly. For example, the ECM controller 110 may receive push notifications from the backend server 123 and may respond accordingly.

The WAL manager 170 logs metadata regarding a transaction that the ECM Controller is about to perform on the content. The WAL manager 170 may be hardware, such as electronic circuitry, for example a co-processor, an ASIC, an FPGA, or any other electronic circuitry. Alternatively or in addition, the WAL manager 170 may include computer instructions that are executable by the processor, such as the processor 140. For example, the computer instructions of the WAL manager 170 may be stored on the memory 150. The WAL manager 170 may store, retrieve, and/or delete transaction log entries in the WAL 180.

According to one embodiment, the WAL 180 is implemented using a distributed file system, such as HDFS. In an example, the WAL 180 includes commodity hardware components so as to scale the WAL 180, and thus the ECM system 100. Addition of such commodity hardware may reduce costs of scaling the ECM system 100. Typically, using commodity hardware may degrade performance and/or increase chances of transaction failures.

The technical solutions described avoid replacing the metadata of the transactions in the WAL 180 using technologies such as NoSQL (for example HBase, MongoDB), which would include rebuilding data model for the ECM system 100. Further, the technical solutions avoid replacing the metadata with personal database management system (PDBMS) such as pure scale. Additionally, the technical solutions facilitate continuous use of an application for accessing the content, even when the application itself does not handle ACID properties of transactions.

Thus, the WAL manager 170 manages the WAL 180 to maintain a key-value store log that provides a low cost scale-out of the ECM system 100 using commodity hardware without losing consistency, ACID properties, write throughput threshold (such as 100k/second), high availability, and fail-over, and data redundancy.

Figure 2:
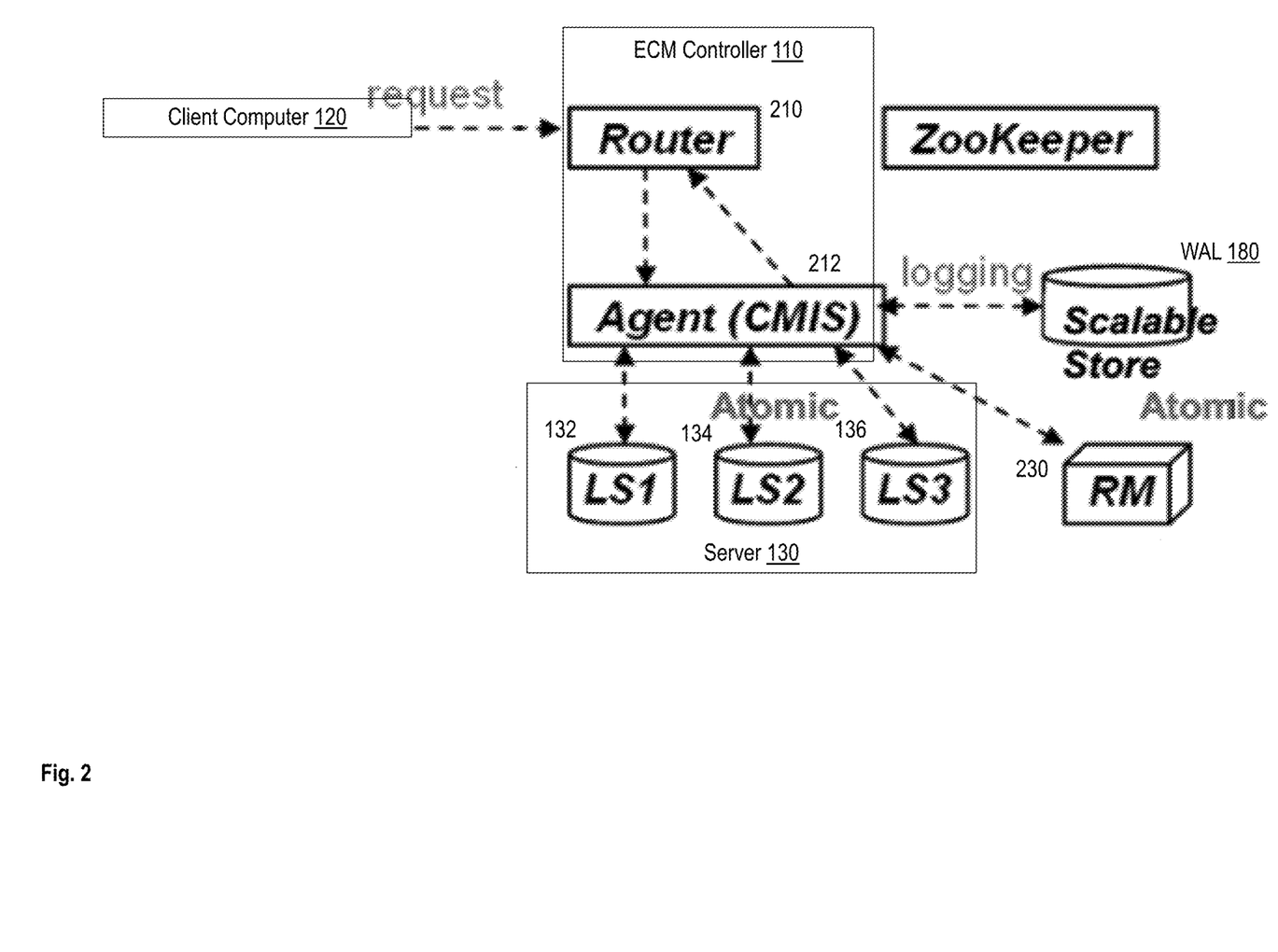
FIG. 2 illustrates an example view of the ECM system in accordance with an embodiment.

Referring now to FIG. 2, an example ECM system 100 in a ZOOKEEPER™ environment is illustrated. ZOOKEEPER is just one example of an environment to maintain the distributed coordination in the ECM system 100. It is understood that other examples may be used. In this example, the ECM controller 110 includes a router 210 and an agent 212. In other examples, the router 210 and/or the agent 212 may be external to the ECM controller 110. The router 210 may proxy the requests from the client computer 120. The agent 212 is responsible to access the content corresponding to the request. For example, the agent 212 accesses the content from the backend server 130 by sending requests/commands to the backend server 130. In an example, the agent 212 may include the WAL manager 170. The example further illustrates a resource manager 230. For example, the ECM system 100 may use a master/worker architecture, in which the Resource Manager 230 acts as the master and manages the resources on the workers and schedules work in the backend server cluster 130. Furthermore, the resource manager 230 may handle client interactions.

Figure 3:
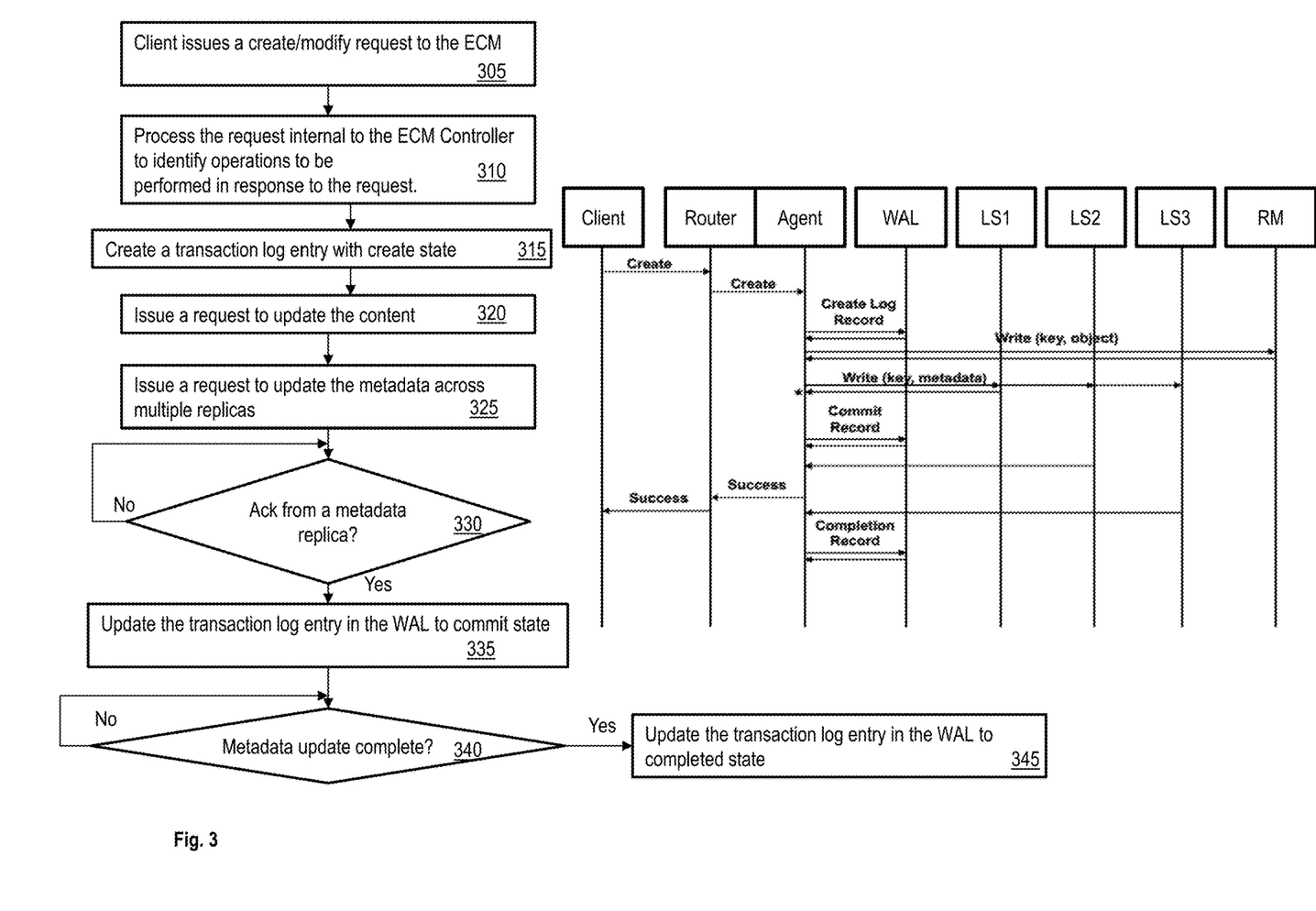
FIG. 3 illustrates example logic used to implement a scalable WAL in accordance with an embodiment.

Referring now to FIG. 3, example logic used to implement a scalable WAL is illustrated. The WAL manager 170 of the ECM controller 110 may implement the example logic. The client computer 120 issues a content modification request, as shown at block 305. The content modification request may include a create or an update request. The components of the ECM controller 110 communicate the request received internally, as shown at block 310. For example, the components, such as the router 210 and the agent 212 may decipher the request to identify the operations to be performed in response to the request. Accordingly, the ECM controller 110 creates a transaction log entry corresponding to the operation to be performed in response to the request, as shown at block 315. The ECM controller 110 creates the transaction log entry in the WAL 180 via the WAL manager 170.

Figure 4:
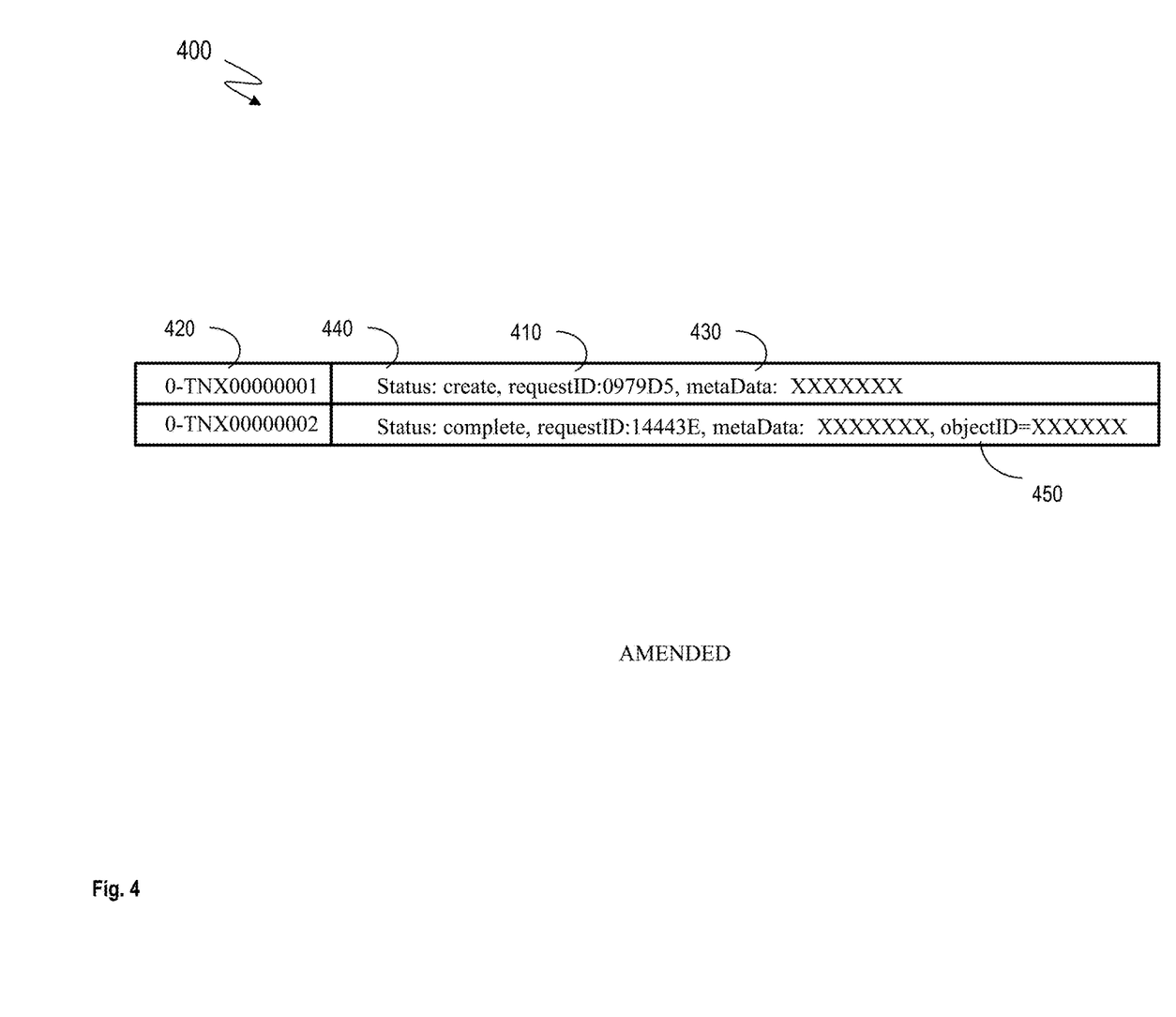
FIG. 4 illustrates an example transaction log entry in accordance with an embodiment.

Referring now to FIG. 4, an example transaction log entry 400 is illustrated. The transaction log entry includes a request identifier 410 of the request received. In an example, the ECM controller 110 assigns the transaction a transaction identifier 420. The transaction identifier may be a sequential number based on a count of the transaction that is about to be performed. The transaction log entry 400 may further include a status 440. A version identifier that corresponds to the status of the transaction may represent the status 440, in an example. For example, the transaction may proceed through at least three states, a create state, a commit state, and a complete state. In an example, other states for the transaction may include an abort state and a replica failed state. The create state is when the transaction is about to begin, and the ECM controller 110 has sent a command to initiate the content modification to the backend server 130, as shown at block 320. The transaction log entry 400 may also include an object identifier 450. The object identifier 450 may be an alternative or a backup for the request identifier 410 to identify the content that is being modified. Metadata 430 corresponding to the transaction is included in the transaction log entry 400. The metadata 430 may be stored and replicated in multiple metadata replicas. Accordingly, the ECM controller 110 issues a request to update the metadata across the multiple replicas, as shown at block 325. The ECM controller 110 waits for at least one of the metadata replicas to acknowledge that the respective metadata copy has been updated. Upon receipt of a first metadata success acknowledgement from one of the multiple metadata replicas, the WAL manager 170 updates the WAL 180.

Figure 5:
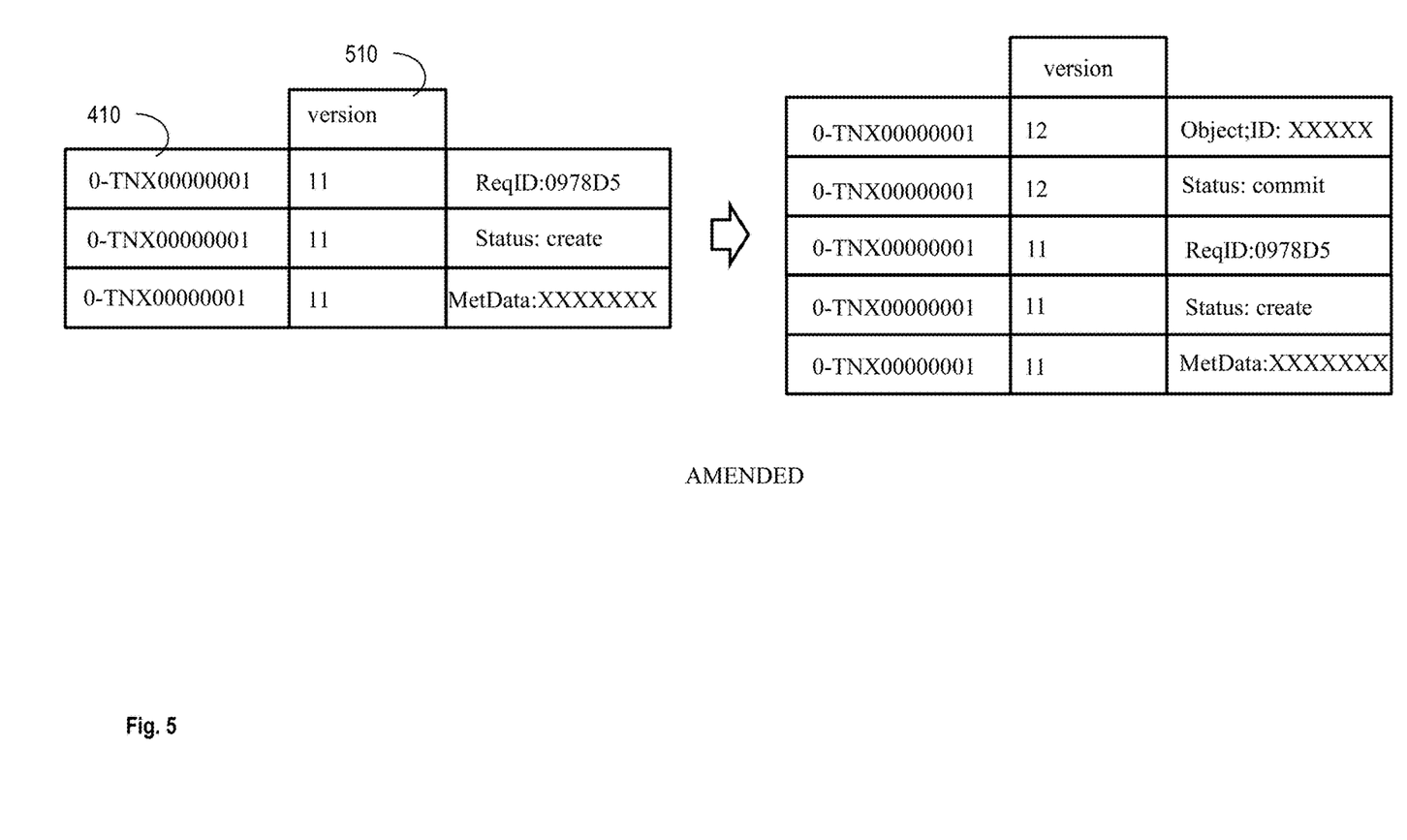
FIG. 5 illustrates an example transaction log entry being updated in accordance with an embodiment.

Referring now to FIG. 5, an example transaction log entry being updated is illustrated. Upon receipt of the first metadata success acknowledgement, the WAL manager 170 updates the transaction log entry 400 with a second version identifier, as shown at blocks 330 and 335. The second version identifier corresponds to a commit state indicative that at least one of the multiple metadata replicas has been updated. As illustrated in FIG. 5, the WAL 180 is implemented as a columnar database. Accordingly, the transaction log entry 400 may be divided into multiple rows, each row including the transaction identifier 410 and the version identifier 510. Each of the rows in the columnar WAL includes one of the request identifier 410, the status 440, and the metadata 430. Upon the update, the version identifier 510 of the transaction log entry may represent the commit state of the transaction. In an example, the update may include inserting a new version of the existing row of the transaction log entry with the status 440 and updating the status 440 and the corresponding version identifier 510. Alternatively, the update may include updating the existing row of the transaction log entry. For the update, the WAL may first identify the transaction log entry in the WAL 180 based on the transaction identifier 420 or the request identifier 410.

In the commit state of the transaction, the ECM controller 110 continues to wait for the transaction to complete. The transaction may be deemed in the complete state when the metadata replicas have been all updated, as shown at block 340. In response to receipt of acknowledgement from each of the metadata replicas, the ECM controller 110 updates the transaction log entry 400 to the complete state, as shown at block 345. In an example, the WAL manager 170 updates the transaction log entry 400 to the complete state in a manner similar to updating to the commit state, that is with a third version identifier. As illustrated, the complete state update may occur after the ECM controller 110 sends a completion status to the client computer 120. For example, the ECM controller 110 may indicate a completion state to the client computer when a predetermined number of replicas (such as 2) of the metadata have been updated.

The WAL 180 with the updated transaction log entry 400 helps avoid degrading the ECM system 100 performance compared to explicitly check-pointing the WAL 180, such as based on a back-end scheduled daemon. The transaction log entry 400 updated as described herein avoids "insert/lookup" operations like random access. Additionally, the WAL 180 with the transaction log entry updated as described herein reduces storage overhead since the entry is deleted during compaction. The WAL 180 may perform the compaction at a prescheduled time, such as at night. The compaction includes garbage collection.

Figure 6:
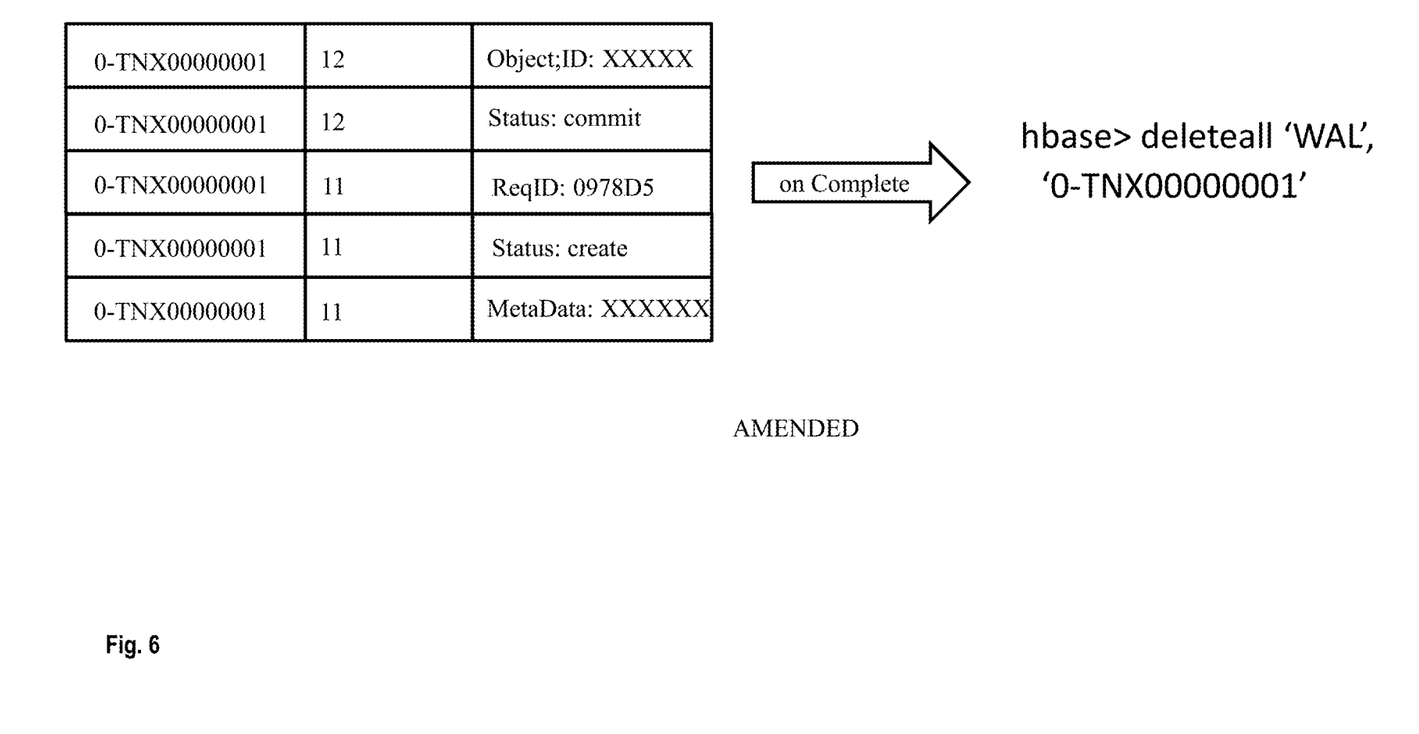
FIG. 6 illustrates a flowchart of example logic for a version based deletion of the WAL in accordance with an embodiment.

Referring now to FIG. 6, a flowchart of example logic for a version based deletion of the WAL is illustrated. In an example, the ECM controller 110, upon completion of the transaction, issues a command to delete all the rows in the WAL 180 corresponding to the transaction. The delete command may indicate deleting all the rows in the columnar database that include the transaction identifier 410.

Figure 7:
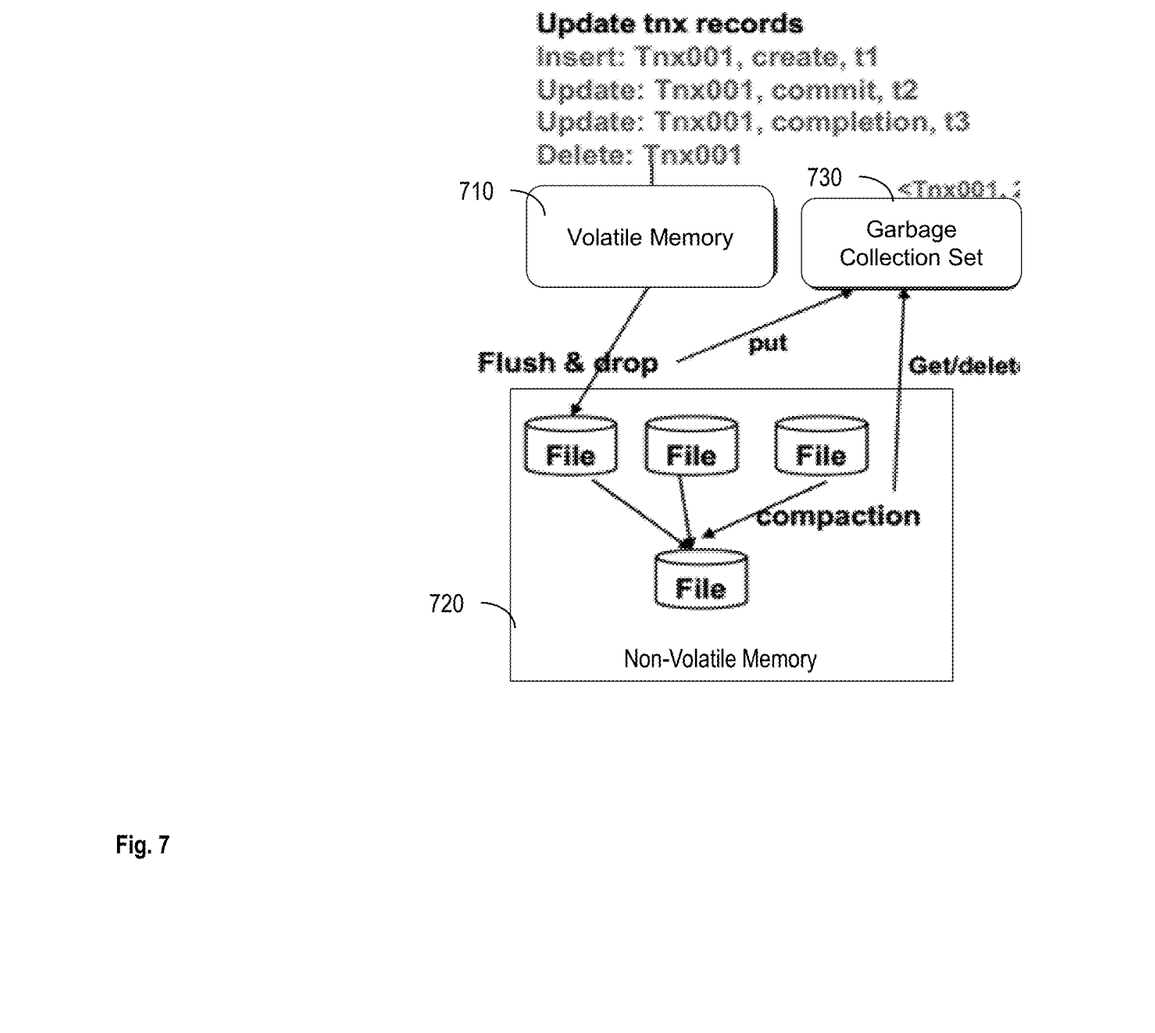
FIG. 7 illustrates an example dataflow of a version based deletion of the transaction log entry from a WAL in accordance with an embodiment.

Referring now to FIG. 7, a dataflow of a version based deletion of the transaction log entry 400 from the WAL 180 is illustrated. The WAL 180, as in any distributed file system, may store the rows of transaction log entry 400 in a volatile memory 710. When a predetermined memory size threshold of the volatile memory 710 is met, the contents of the volatile memory 710 are flushed into a non-volatile memory 720. The non-volatile memory 720 includes a multiple disks where the data from the volatile memory 710 is stored using the distributed file system of the WAL 180. The WAL 180 implements a garbage collection, and may mark data that is to be collected by the garbage collector using a garbage collection identifier. For example, if the WAL 180 uses HDFS, the WAL 180 may use the Tombstone keywords for the garbage collection. The data marked with the garbage collection identifier may be logically considered as part of a garbage collection set 730.

Figure 8:
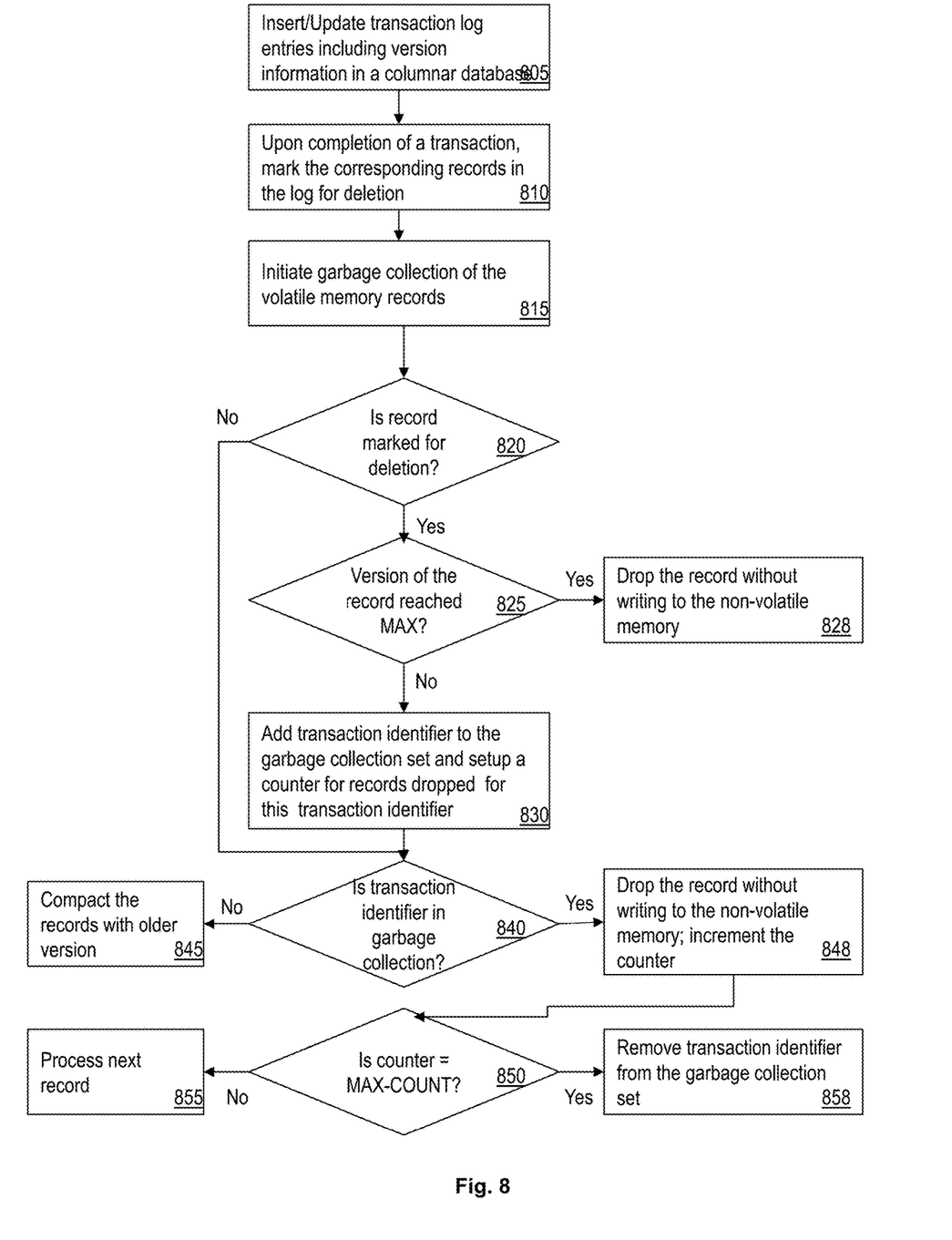
FIG. 8 illustrates a flowchart of example logic for the version based deletion in accordance with an embodiment.

Referring now to FIG. 8, example logic for the version based deletion is illustrated. The WAL manager 170 implements the version based deletion after the transaction has completed. As described herein, the WAL manager 170 records transaction log entries in a columnar database, with each entry inserted or updated with a version identifier corresponding to a transaction status, as shown at block 805. The entries are stored in the volatile memory 710. The WAL manager 170 issues a command to delete all the records in the WAL 180 that include the transaction identifier 410 upon completion of the transaction. Upon completion of a transaction, mark the corresponding records in the WAL 180 for deletion. For example, upon issuance of the delete command, the WAL 180 marks the records with the garbage collection identifier, and not delete the record at that time, as shown at block 810. The actual deletion may be performed at time of garbage collection. The WAL 180 may initiate the garbage collection of the records in the volatile memory 710, as shown at block 815. The WAL 180 may initiate the garbage collection according a predetermined schedule. Alternative or in addition the WAL 180 may initiate the garbage collection in response to the amount of available volatile memory being below a predetermined threshold.

The garbage collection processes each record (or row) of the WAL 180. The garbage collection involves a first phase that includes a merge and sort of the records of the transaction log entries in the WAL 180. In the merge and sort phase, the garbage collection identifies if the row is marked for deletion, as shown at block 820. If the record is part of the transaction log entry 400 that has been marked for deletion, the WAL 180 checks if the corresponding transaction log entry version has reached a maximum version value, as shown at block 825. The maximum version value is based on the number of states that the transaction can pass through. For example, if the transaction passes through creation, commit/abort, and complete/fail states, the maximum version value is 3. If the record is marked for deletion and the maximum version value has been reached, the WAL 180 deletes the record from the volatile memory, and does not write the record to the non-volatile memory 720, as shown at block 828. Else, if the maximum version value has not been reached, the WAL 180 adds the transaction identifier 410 of the record into the garbage collection set 730, as shown at block 830. In addition, a counter corresponding to the transaction identifier is setup. The counter keeps track of a number of records for the transaction identifier that have been dropped without writing to the non-volatile memory 720. The counter starts from 0 (zero).

In a second phase of garbage collection, the WAL 180 compacts the records of the transaction log entries that are in the volatile memory 710 and the garbage collection set 730. The records in the garbage collection set may continue to be in the volatile memory 710, marked with the garbage collection identifier. In the compaction phase, the WAL 180 checks if the record includes a transaction identifier that is included in the garbage collection set 730, as shown at block 840. If the transaction identifier is not in the garbage collection set 730, the record is merged with the older versions, as shown at block 845. Else, if the transaction identifier is in the garbage collection set 730, the record is dropped without writing it to the non-volatile memory 720, as shown at block 848. In addition, the counter corresponding to the transaction identifier is incremented, as shown at block 848. The WAL 180 checks if the counter has reached a maximum counter value, as shown at block 850. The maximum count value depends on the maximum version value and the number of records added for each transaction log entry. For example, as shown in FIG. 5, if the transaction log entry includes three rows, and the maximum version value is 3, the maximum count value is 9 (3 rows for each version). The maximum count value may be related to the maximum version value differently, in different examples. If the maximum count value has been reached, the WAL 180 removes the transaction identifier from the garbage collection set 730. Else, the WAL 180 processes the next record in a similar manner.

The version based deletion logic for WAL logging data management facilitates managing the transaction logging with specific sort-merge based framework (that is write the log entries to the memory first, and flush to disk in batch). For the version based deletion the WAL manager 170 updates the transaction entries according to state (such as create/update, commit, completion) of the corresponding transactions, for example using version numbers. The WAL manager 170 further marks the transaction entries with "delete" marker when updating to the completion state. Subsequently, the version based deletion logic drops the transaction during flush if number of versions equals to the number of transaction states. Further, using garbage collection of the WAL 180, for example the tombstone key set in HDFS, the WAL manager 170 facilitates compaction of partially deleted transactional records in to further reduce disk I/O.

Thus, the ECM system 100 can be scaled efficiently using a scalable WAL that is implemented using the technical solutions described herein. The ECM system 100 using the WAL as described herein has a scalable write throughput and strong consistency (among both replica and object store). Additionally, the scalable WAL described herein continues to be compatible with legacy ECM systems and data models, and thus, facilitating scaling the ECM systems by simply extending a consistency server farm. Further yet, the scalable WAL examples do not have a single-point of failure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A method for providing consistency among metadata replicas and content in an enterprise content management cluster, the method comprising:
   recording, by a processor, a transaction log entry in response to receiving a content modification request, the transaction log entry comprising a version identifier set to a first version value for a transaction, wherein the processor records the transaction log entry in a write ahead log that uses a Hadoop Distributed File System (HDFS) and wherein the transaction log entry is configured to, in response to completing the transaction, mark data that is to be collected by garbage collection using a garbage collection identifier;
   updating, by the processor, the transaction log entry in response to successfully modifying content and one of a plurality of metadata replicas containing metadata corresponding to the content modification request, wherein the version identifier of the transaction log entry is updated to a second version value for the transaction;
   updating, by the processor, the transaction log entry upon successfully modifying each of the metadata replicas, wherein the version identifier of the transaction log entry is updated to a third version value for the transaction, wherein the first, the second, and the third version values are distinct and are each associated with the transaction identifier for the transaction, wherein the first, the second, and the third version values represent, respectively, a plurality of execution states of the content modification request, each of the plurality of execution states being associated with the transaction identifier;
   determining that the content modification request has achieved a completed state in response to receiving a respective acknowledgement from each of the plurality of metadata replicas that indicates that the metadata replica has been updated;
   checking that the transaction log entry has reached a numerical value, the numerical value being a summation of the plurality of execution states through which the transaction is configured to be executed, wherein the numerical value increases by 1 for each of a create state, a commit state, and a complete state; and
   deleting the transaction log entry from volatile memory in response to the numerical value being reached.

2. The method of claim 1 wherein the processor records the transaction log entry in the write ahead log that uses a distributed file system.

3. The method of claim 2, wherein the distributed file system is a columnar database.

4. The method of claim 1, wherein the first version value is representative of a content update state of the content modification request.

5. The method of claim 4, wherein the second version value is representative of a commit state for the content modification request.

6. The method of claim 5, wherein the third version value is representative of the completion state for the content modification request.

7. The method of claim 2, wherein updating the transaction log entry comprises:
identifying, by the processor, the transaction log entry based on a transaction identifier included in the transaction log entry, the transaction identifier associated with the content modification request.

8. The method of claim 2, further comprising:
marking, by the processor, the transaction log entry with the garbage collection identifier that is indicative that the transaction log entry is to be deleted.

9. The method of claim 8, further comprising:
compacting, by the processor, the write ahead log by recording the write ahead log to a disk, wherein, in response to the transaction log entry being marked as deleted on each node of the distributed file system, the transaction log entry is not written to the disk.

10. The method of claim 9, wherein compacting the write ahead log further comprises, in response to the transaction log entry not being marked as deleted on each node of the distributed file system:
adding a transaction identifier of the transaction log entry to a garbage collection set of the garbage collection; and
initializing a counter associated with the transaction log entry, and setting a value of the counter to a number of nodes of the distributed file system on which the transaction log entry is marked as deleted.

11. The method of claim 10, further comprising:
garbage collecting, by the processor, the write ahead log, wherein the garbage collection comprises:
identifying the transaction log entry based on the transaction identifier added to the garbage collection set;
determining if the value of the counter associated with the transaction log entry is equal to the number of nodes in the distributed file system; and
in response to the value being less than the number of nodes, incrementing the value of the counter and skipping to a next transaction log entry in the write ahead log.

12. The method of claim 11, wherein the garbage collection further comprises, in response to the value being equal to the number of nodes, deleting the transaction identifier from the garbage collection set.

13. The method of claim 1, wherein the numerical value of the plurality of execution states to reach further comprises one or more other states such that the numerical value is further incremented by 1 for each of the one or more other states.

14. The method of claim 1 further comprising adding the transaction log entry to a garbage collection set in response to the numerical value not being reached.

* * * * *